United States Patent [19]
Grove

[11] Patent Number: 5,187,478
[45] Date of Patent: * Feb. 16, 1993

[54] CONFIGURATION RESPONSIVE DESCENT RATE WARNING SYSTEM FOR AIRCRAFT

[75] Inventor: Michael M. Grove, Kirkland, Wash.

[73] Assignee: Sundstrand Corporation, Rockford, Ill.

[ * ] Notice: The portion of the term of this patent subsequent to Aug. 6, 2008 has been disclaimed.

[21] Appl. No.: 677,160

[22] Filed: Mar. 29, 1991

Related U.S. Application Data

[63] Continuation of Ser. No. 81,557, Jul. 31, 1987, Pat. No. 5,038,141, which is a continuation of Ser. No. 704,364, Feb. 22, 1985, abandoned.

[51] Int. Cl.$^5$ .............................................. G08B 23/00
[52] U.S. Cl. .................................. 340/970; 340/963; 342/65
[58] Field of Search ............... 340/963, 964, 970, 977; 73/178 R, 178 T; 244/180; 342/65; 364/433

[56] References Cited

U.S. PATENT DOCUMENTS

| | | | |
|---|---|---|---|
| 3,946,358 | 3/1976 | Bateman | 340/970 |
| 3,947,808 | 3/1976 | Bateman | 340/970 |
| 3,958,219 | 5/1976 | Bateman et al. | 340/970 |
| 4,030,065 | 6/1977 | Bateman | 340/970 |
| 4,215,334 | 7/1980 | Bateman | 340/970 |
| 4,551,723 | 11/1985 | Paterson | 340/946 |
| 4,567,483 | 1/1986 | Bateman et al. | 340/970 |
| 4,951,047 | 8/1990 | Paterson et al. | 340/970 |
| 5,038,141 | 8/1991 | Grove | 340/963 |

FOREIGN PATENT DOCUMENTS 8601022 2/1986 World Int. Prop. O. .......... 340/970

Primary Examiner—Jin F. Ng
Assistant Examiner—Brent A. Swarthout
Attorney, Agent, or Firm—Fitch, Even, Tabin & Flannery

[57] ABSTRACT

Warning systems that monitor the altitude above ground and descent rate of an aircraft and generates a warning if the descent rate of the aircraft is excessive for the altitude in which the aircraft is flying are well suited to aircraft whose flight and operational characteristics are readily predictable but not as suitable for aircraft, such as tactical aircraft whose operating conditions are not so predictable. To overcome this problem, the criteria for providing the warnings are altered (30, 32) as a function of flight configuration (16, 18) to optimize the warnings for different flight conditions.

13 Claims, 4 Drawing Sheets

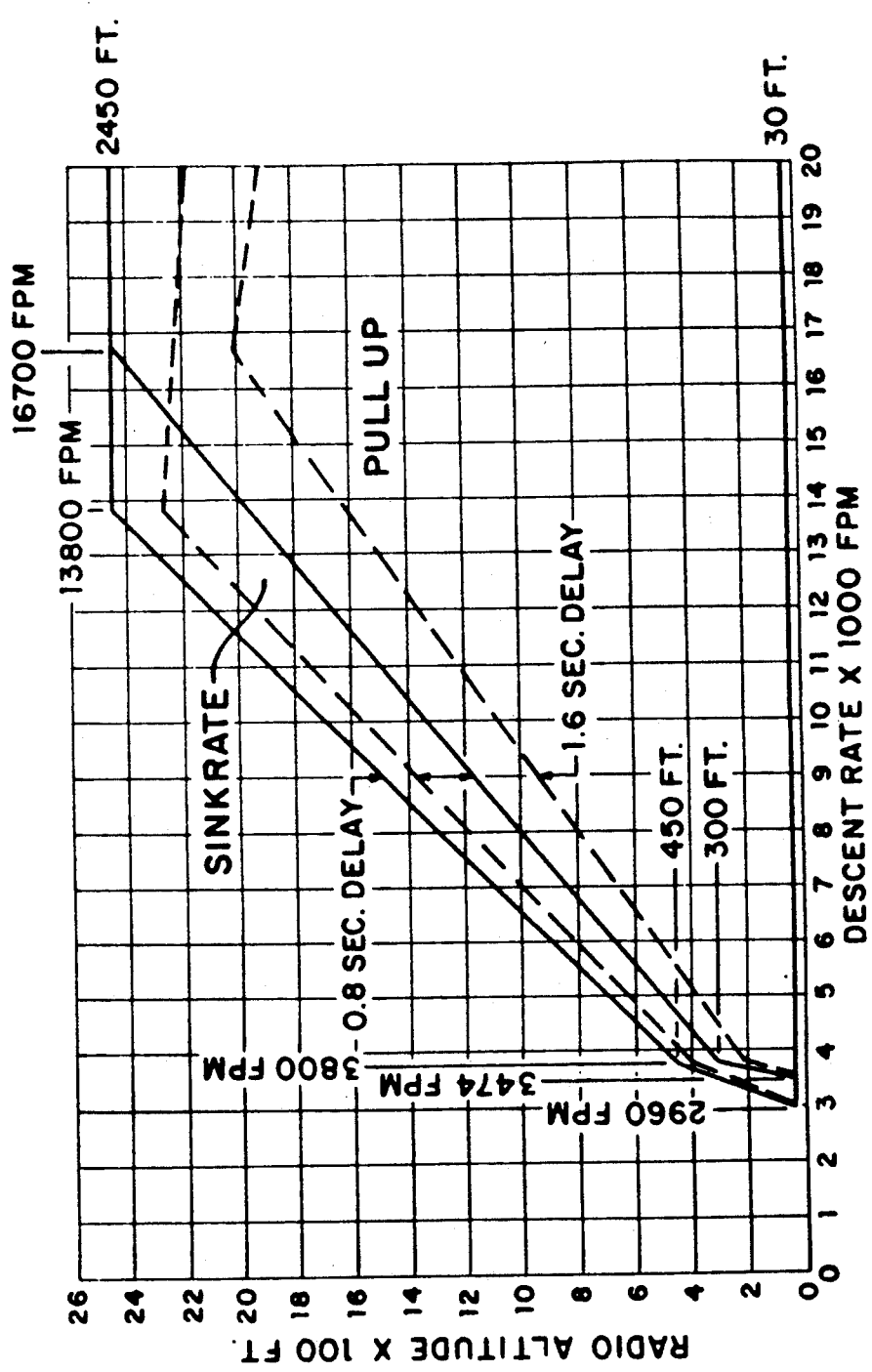

CONFIGURATION RESPONSIVE DESCENT RATE WARNING SYSTEM FOR AIRCRAFT

This application is a continuation of application Ser. No. 07/081,557, filed on Jul. 31, 1987 and now U.S. Pat. No. 5,038,191; which application is a continuation of application Ser. No. 06/704,364, filed on Feb. 22, 1985, now abandoned.

BACKGROUND OF THE INVENTION

1. Field of the Invention

This invention relates generally to ground proximity warning systems and, more particularly, to a system that provides a warning to the pilot of an aircraft if the descent rate of the aircraft is excessive for the altitude at which the aircraft is flying. The criteria for determining whether or not such a warning is to be generated are alterable as a function of the configuration of the aircraft. Such a warning system is particularly useful for carrier based antisubmarine aircraft such as the Lockheed S3-A.

2. Description of the Prior Art

Systems for providing the pilot of an aircraft with a warning in the event that the aircraft is descending too rapidly are known. Examples of such systems are disclosed in U.S. Pat. Nos. 3,946,358; 3,947,808; 3,958,219 and 4,215,334, all assigned to the same assignee as the assignee of the present invention.

While all of the above systems serve the basic function of alerting the pilot if the descent rate of the aircraft exceeds a predetermined safe descent rate determined by the altitude above ground of the aircraft, the above systems are designed to operate with transport aircraft whose operational and flight conditions are such that the approach and landing conditions are readily predictable. However, for aircraft such as, for example, military and tactical aircraft whose operational and flight conditions can vary widely, systems designed for aircraft having predictable flight parameters tend to provide false or nuisance warnings where no unsafe condition actually exists, and may provide less than the desired warning times under other conditions.

SUMMARY OF THE INVENTION

Accordingly, it is an object of the present invention to provide a ground proximity warning system that overcomes many of the disadvantages of the prior art warning systems.

It is another object of the present invention to provide a warning to the pilot of an aircraft if the descent rate of the aircraft is excessive for the altitude above ground and flight configuration of the aircraft.

It is yet another object of the present invention to provide a ground proximity warning system for alerting the pilot of an aircraft if its descent rate is dangerously high, and where the criteria for determining whether the descent rate is excessively high are altered as a function of flight configuration of the aircraft.

It is another object of the present invention to provide a warning system that generates a warning if the descent rate of the aircraft is excessively high for the altitude at which the aircraft is flying, but does not generate an appreciable number of false or nuisance warnings when used in a maneuverable aircraft.

It is yet another object of the present invention to provide a ground proximity warning system particularly useful for tactical aircraft wherein the criteria used to determine whether a warning should be generated are adjusted depending on the flight configuration of the aircraft.

Briefly, in accordance with a preferred embodiment of the invention, there is provided a system that monitors the altitude above ground and the descent rate of an aircraft and issues a first aural warning if the descent rate exceeds a predetermined safe limit for the radio altitude at which the aircraft is flying. If the descent rat exceeds the predetermined safe limit by a predetermined margin, a second distinct aural warning is generated to warn the pilot of a particularly dangerous flight condition. The criteria for generating the warnings are altered as a function of the flight configuration of the aircraft, for example, whether the landing gear is up or down and whether the aircraft is flying a tactical or non-tactical segment of a mission to optimize the warning criteria for the operational conditions of the aircraft.

DESCRIPTION OF THE DRAWING

These and other objects and advantages of the present invention will become readily apparent upon consideration of the following detailed description and attached drawing wherein:

FIG. 4 is a graph of the descent rate required to generate the two warnings as a function of radio altitude when the aircraft is operating in a tactical mode and the landing gear is up.

DETAILED DESCRIPTION OF THE PREFERRED EMBODIMENT

Figure 1:
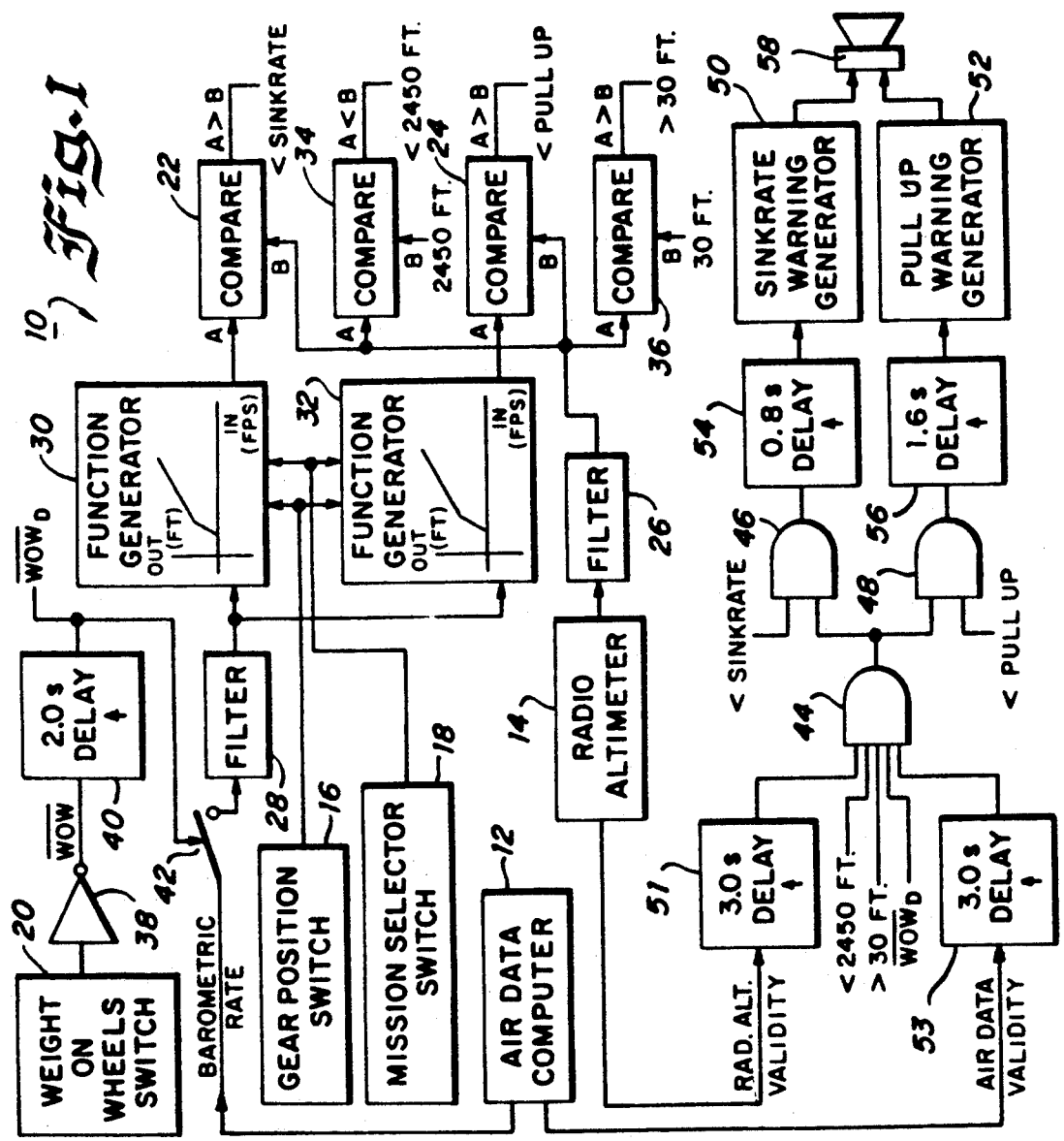
FIG. 1 is a logical block diagram of the warning system according to the invention.

Referring now to the drawing with particular attention to FIG. 1, there is illustrated an embodiment of the configuration responsive ground proximity warning system according to the invention generally designated by the reference numeral 10. The system 10 according to the invention is illustrated in FIG. 1 in logical block diagram form as a series of gates, comparators and the like for purposes of illustration; however, it should be understood actual implementation of the logic can be other than as shown in FIG. 1, with various digital and analog implementations being possible. The signals used by the system as described include radio altitude and barometric altitude rate, a signal indicative of a tactical mission, for example, a mission selector switch, a landing gear position switch, a weight on wheels switch and various validity signals. Depending on the type of aircraft on which the warning system is installed, the signals shown in FIG. 1 can be obtained from individual instruments such as an air data computer 12, a radio altimeter 14, a gear position switch 16, a mission selector switch 18 and a weight on wheels switch 20. Alternatively, the barometric rate signal may be obtained by differentiating a barometric altitude signal from a barometric altimeter, or the Z-velocity signal from an inertial navigation system may be used to obtain descent rate information. Also, rather than obtaining the signals from individual instruments, the signals can be obtained from a digital data bus in certain newer aircraft.

As previously stated, the system according to the invention compares the altitude above ground with the descent rate, preferably barometric descent rate or Z-velocity, and issues a warning if the descent rate is excessive for the altitude at which the aircraft is flying. The comparison function is provided by two mode comparators 22 and 24 which, in the present embodiment, compare the radio altitude received from the radio altimeter 14 via a filter 26 which removes high frequency components from the radio altitude signal. The radio altitude signal is compared with the barometric rate signal that is applied to the comparators 22 and 24 via a low pass filter 28 and a pair of function generators 30 and 32, respectively. The radio altitude signal is also compared with a 2450 foot reference signal and a 30 foot reference signal by a pair of comparators 34 and 36 to provide enabling signals to the system when the aircraft is flying between 30 feet and 2450 feet. Although, in the embodiment illustrated in FIG. 1, the comparators and function generators have been illustrated as separate components for purposes of clarity, the comparison function required to generate the appropriate warnings could be provided by a single comparator, or otherwise. For example, the function generation and comparison functions could be combined in a single block.

In addition to the comparison and warning generation functions discussed above, the system utilizes a plurality of gates and discrete switches to enable the system only during predetermined phases of flight. These enabling functions are provided by the weight on wheels switch which cooperates with an inverter 38 and a delay circuit 40 to close a switch 42 to permit the barometric rate signal to be applied to the filter 28 only when there is no weight on the wheels of the aircraft, that is, the aircraft is off the ground. In addition, a series of AND gates 44, 46 and 48 and delay circuits 51 and 53 enable the system only when the signal from the radio altimeter and the air data computer are valid, when there is no weight on the wheels and when the aircraft is flying within a predetermined range of altitudes, for example, between 30 and 2450 feet.

In addition, the system includes a pair of aural warning generators such as a sink rate warning generator 50 and a pull up warning generator 52 that are activated by signals received from the gates 46 and 48 via a pair of delay circuits 54 and 56 and apply either a "SINK RATE" or a "PULL UP" warning to a transducer 58.

In operation, whenever the aircraft is flying between 30 and 2460 feet the gates 44, 46 and 48 are enabled and the switch 42 is closed so that the barometric rate signal is applied to the function generators 30 and 32. Under these conditions, if the combination of descent rate and altitude above ground is such that the warning criteria established by the function generator 30 and the comparator 22 are exceeded, the sink rate comparator 22 will apply a signal to the AND gate 46, thereby causing the AND gate 46 to apply a warning initiation signal to the sink rate generator 50 after delay circuit 54 has operated. Similarly, if the combination of descent rate and altitude above ground is such that the warning criteria established by the function generator 32 and the comparator 24 are exceeded, the comparator 24 will apply an enabling signal to the AND gate 48 to apply a warning initiation signal to the pull up warning generator 52, after the delay circuit 56 has operated. The sink rate and pull up warning generators 50 and 52 are preferably digital voice generators that apply the warnings to the transducer 58 either directly or indirectly, for example, through the intercom system of the aircraft.

As previously stated, the criteria for determining whether a sink rate or a pull up warning are to be generated are determined by the configuration of the aircraft. In the illustrated embodiment, the modification of the warning criteria is accomplished by modifying the characteristics of the function generators 30 and 32 by discrete signals from the gear position switch 16 and the mission selector switch 18. The mission selector switch is actuated by the pilot whenever a tactical mission, such as an anti-submarine reconnaissance or attack mission is being flown. In the illustrated embodiment, the function generators 30 and 32 are altered to modify the barometric rate signal from the filter 28 in order to obtain the desired warning criteria; however, in alternative embodiments the radio altitude signal could be altered instead.

Figure 2:
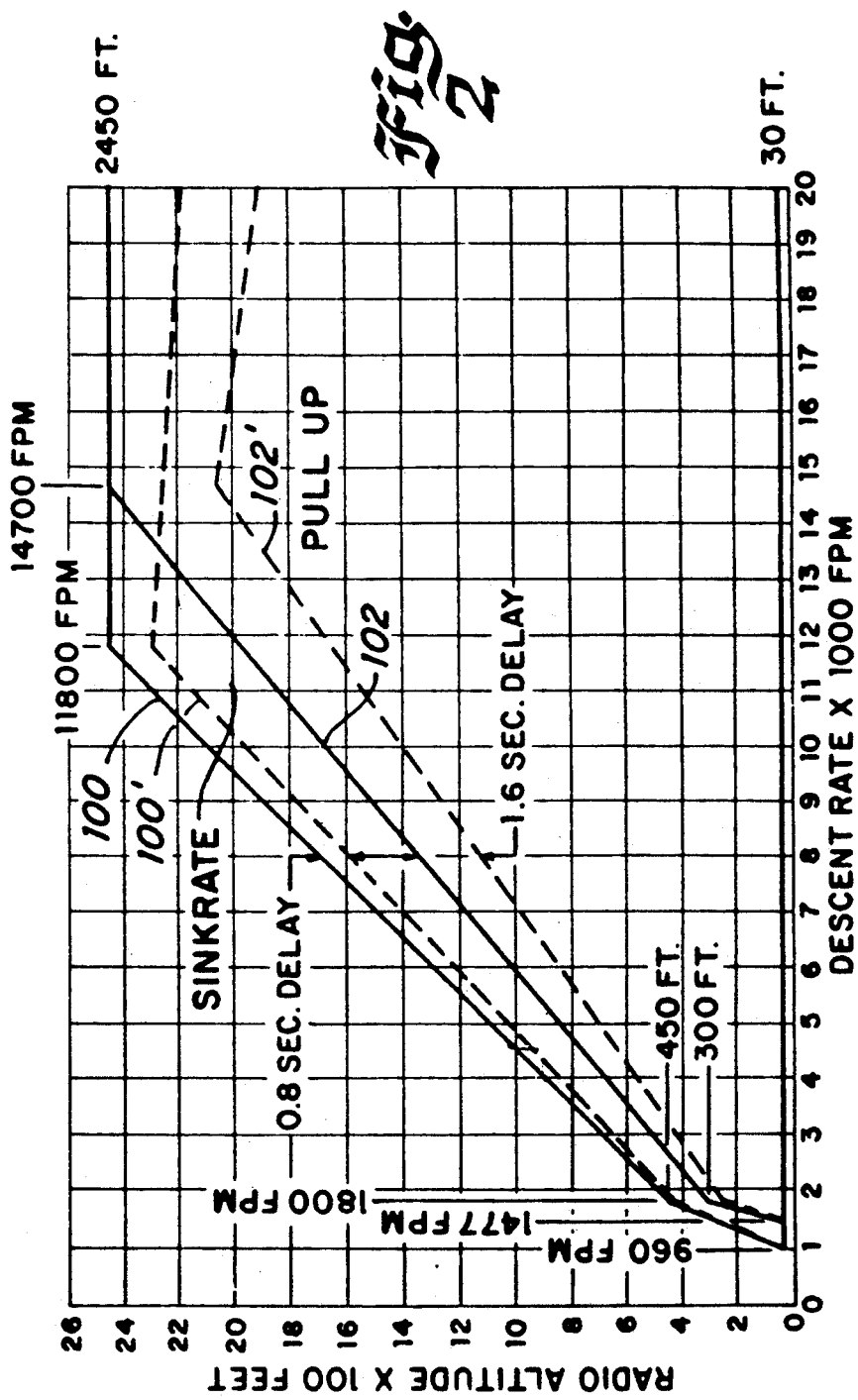
FIG. 2 is a graph of the descent rate required to generate the two warnings as a function of radio altitude when the aircraft is operating in a gear up configuration.

When the aircraft is flying with its gear up, the function provided by the function generator 30 is selected such that the "SINK RATE" warning will be generated whenever the relationship between the descent rate and the radio altitude is such that it falls within the envelope below the line 100 (FIG. 2). The "PULL UP" warning will be initiated if the envelope below the line 102 is penetrated. Because of the delays provided by the delay 54 (0.8 second) and the delay 56 (1.6 seconds) the actual warning will not occur until the envelope illustrated by the dashed lines 100' and 102' is penetrated. Thus, the delays serve to reduce nuisance warnings in instances where the envelopes 100 and 102 are only momentarily penetrated.

Figure 3:
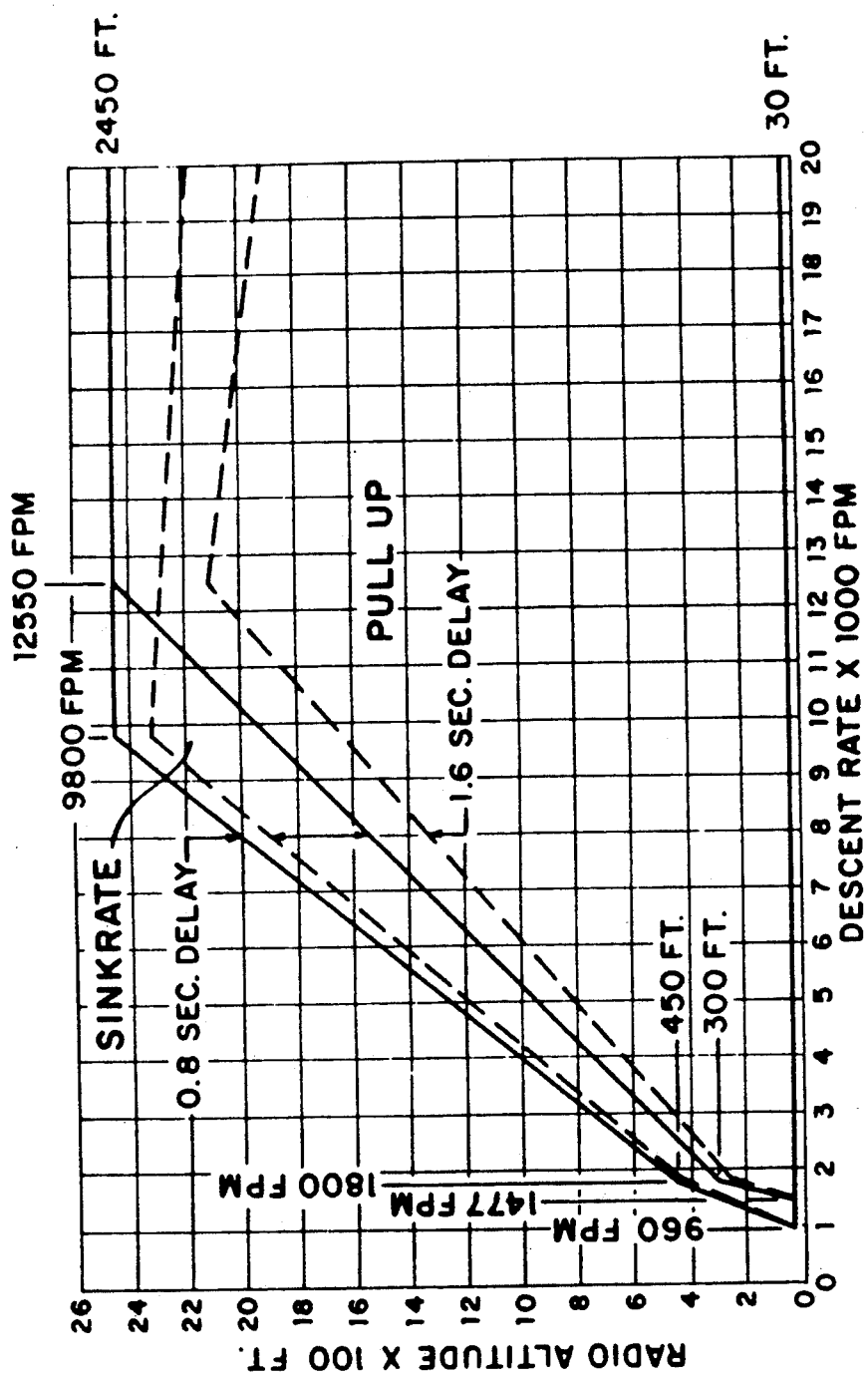
FIG. 3 is a graph of the descent rates required to generate the two warnings as a function of radio altitude when the aircraft is operating with its landing gear down.

Whenever the aircraft lowers its landing gear, and is not in a tactical mode, the warning criteria are altered as is shown in FIG. 3 to make the warning system more sensitive at higher altitudes. Thus, with the landing gear down, the "SINK RATE" warning will be given at a descent rate of 9800 feet per minute at an altitude of 2460 feet as opposed to the 11,800 feet per minute descent rate required at the same altitude with the landing gear up. Similarly, the pull up warning will be given at 12,550 feet per minute at 2460 feet rather than at 14,700 feet per minute. This takes into account the reduced recovery capability of an aircraft when the landing gear is down.

Whenever an aircraft is in a tactical phase of flight, such as, for example, when it is attacking a target, higher descent rates are encountered than are encountered in a non-tactical phase of flight. Thus, the warning criteria must be modified accordingly, in order to avoid nuisance warnings, and the criteria illustrated in FIG. 4 are utilized to provide additional maneuvering room for the aircraft before a warning is generated. These criteria are used only when both the landing gear is up and the mission selector switch indicates a tactical mode of operation.

The tactical mode criteria require a 13,800 foot per minute and a 16,700 foot per minute descent rate before the "SINK RATE" and "PULL UP" warnings, respectively, are generated when the altitude of the aircraft is 2460 feet. In addition, the descent rates required for a warning to be generated at low altitudes, for example, below 450 feet, are also substantially increased. For example, at 450 feet a 3800 foot per minute descent rate is required before the "SINK RATE" warning is generated, and at 30 feet of radio altitude, a descent rate of 2960 feet per minute is required. To generate a "PULL UP" warning at 30 feet of radio altitude, a 3474 feet per minute descent rate is required, and 3800 feet per minute is required at 300 feet of radio altitude. Thus, the system permits the aircraft to maneuver at low altitudes, for example, as it does during submarine reconnaissance missions without generating nuisance warnings.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A warning system for warning the pilot of an aircraft of an unsafe flight condition, comprising:
   means for receiving a signal representative of the descent rate of the aircraft;
   means for receiving a signal representative of the radio altitude of the aircraft;
   means for receiving a signal representative of the position of the landing gear;
   means responsive to the signals representative of the radio altitude of the aircraft, the descent rate of the aircraft and the landing gear position for generating a warning if the magnitude of the descent rate of the aircraft exceeds a predetermined rate for a particular altitude at which the aircraft is flying as determined by a predetermined relationship between radio altitude and descent rate when said aircraft is flying with its landing gear up; and
   means responsive to the landing gear position representative signal for changing said predetermined relationship between radio altitude and descent rate to a different predetermined relationship between radio altitude and descent rate when said aircraft is flying with its landing gear down, said different predetermined relationship being selected to cause the warning to be generated at a descent rate magnitude that is lower for the same particular altitude at which the aircraft is flying than the descent rate magnitude required to generate a warning when the landing gear is up.

2. A warning system as recited in claim 1, wherein said second predetermined relationship provides a warning earlier than said first predetermined relationship.

3. A warning system as recited in claim 1 further including means responsive to the mode of operation of the aircraft for changing said first predetermined relationship to a different third predetermined relationship when said aircraft is in a tactical mode.

4. A warning system as recited in claim 3, wherein said third predetermined relationship provides said warning later than said first predetermined relationship.

5. A warning system as recited in claim 1, wherein said descent is a barometric descent rate.

6. A warning system for warning the pilot of an aircraft of an unsafe flight condition, comprising:
   means for receiving a signal representative of the descent rate of the aircraft;
   means for receiving a signal representative of the radio altitude of the aircraft;
   means for receiving a signal representative of the position of the landing gear;
   means responsive to the descent rate representative signal and the radio altitude representative signal for generating a first warning signal when the magnitude of the descent rate at a particular altitude at which the aircraft is flying exceeds a first predetermined value of magnitude of descent rate which is determined for the aircraft when its landing gear is down;
   means responsive to the descent rate representative signal and the radio altitude representative signal for generating a second warning signal when the magnitude of the descent rate at said altitude exceeds a second predetermined value of magnitude of decent rate at the same particular latitude, said second predetermined value being relatively larger than said first predetermined value and determined for the aircraft when its landing gear is up; and
   means responsive to the landing gear position representative signal for selecting said first warning generating means or said second warning generating means as a function of the landing gear position.

7. A warning system as recited in claim 6, wherein said descent rate signal is a barometric descent rate signal.

8. A warning system as recited in claim 6, wherein said descent rate signal is a Z-velocity signal.

9. A warning system as recited in claim 6 further including means for inhibiting said first and second warning generator means until the aircraft is airborne.

10. A warning system as recited in claim 9, wherein said inhibiting means includes a weight on wheels switch to determine whether the aircraft is airborne.

11. A warning system as recited in claim 9 further including means for inhibiting said first and second warning generator means unless the aircraft is within a predetermined altitude band.

12. A warning system for warning the pilot of an aircraft of an unsafe flight condition comprising:
   means for receiving a signal representative of the radio altitude of the aircraft;
   means for receiving a signal representative of the descent rate of the aircraft;
   means for detecting the position of the landing gear;
   means responsive to said descent rate representative signal, said radio altitude representative signal and said detecting means for generating a warning signal when the magnitude of the descent rate exceeds a predetermined value at a particular radio altitude determined for the aircraft when the landing gear is up; and
   means responsive to said landing gear position detecting means for decreasing said predetermined value of magnitude of descent rate required to generate a warning at the same particular altitude when the landing gear is down.

13. A warning system as recited in claim 12 further including:
   means for detecting when the aircraft is in a tactical mode of operation; and
   means for increasing said predetermined value when the aircraft is in a tactical mode of operation and the landing gear is up.

* * * * *